United States Patent [19]

Lutz et al.

[11] 4,218,068
[45] Aug. 19, 1980

[54] DEFLECTABLE HOLDING ASSEMBLY

[75] Inventors: Karl T. Lutz, Gardner; John L. Shepard, Joliet, both of Ill.

[73] Assignee: Caterpillar Tractor Co., Peoria, Ill.

[21] Appl. No.: 4,792

[22] Filed: Dec. 26, 1978

[51] Int. Cl.² .................. B23B 31/00; B23B 29/00
[52] U.S. Cl. .................................... 279/1 L; 279/6;
279/1 D; 408/153; 408/238; 51/237 R; 403/4
[58] Field of Search .......... 279/1 L, 1 J, 1 D, 6,
279/16; 408/150, 153, 238, 146, 148, 147, 156,
714; 51/225, 237; 403/4, 50

[56] References Cited

U.S. PATENT DOCUMENTS

| 2,276,945 | 3/1942  | Ehrich ........................... 279/6 |
| 2,524,852 | 10/1950 | Stauss ........................... 279/6 |
| 2,815,958 | 12/1957 | Minati ......................... 279/1 L |
| 2,828,132 | 3/1958  | MacFarlane ..................... 279/16 |
| 3,544,117 | 3/1968  | Bingham ....................... 279/1 L |

Primary Examiner—Gil Weidenfeld
Attorney, Agent, or Firm—Frank L. Hart

[57] ABSTRACT

This invention relates to a holding assembly (10) for connecting a shaft (20) to a drive member (16), the holding assembly has a body (12), first and second end portions (14,18) and a middle portion (21), a member (52) is connected to the body (12) at the middle portion (21) for selectively controllably deflecting one of the first and second end portions (14,18) to preselected relative positions and eliminating runout in the shaft (20). The holding assembly (10) is particularly useful on a boring machine.

8 Claims, 2 Drawing Figures

U.S. Patent    Aug. 19, 1980    4,218,068
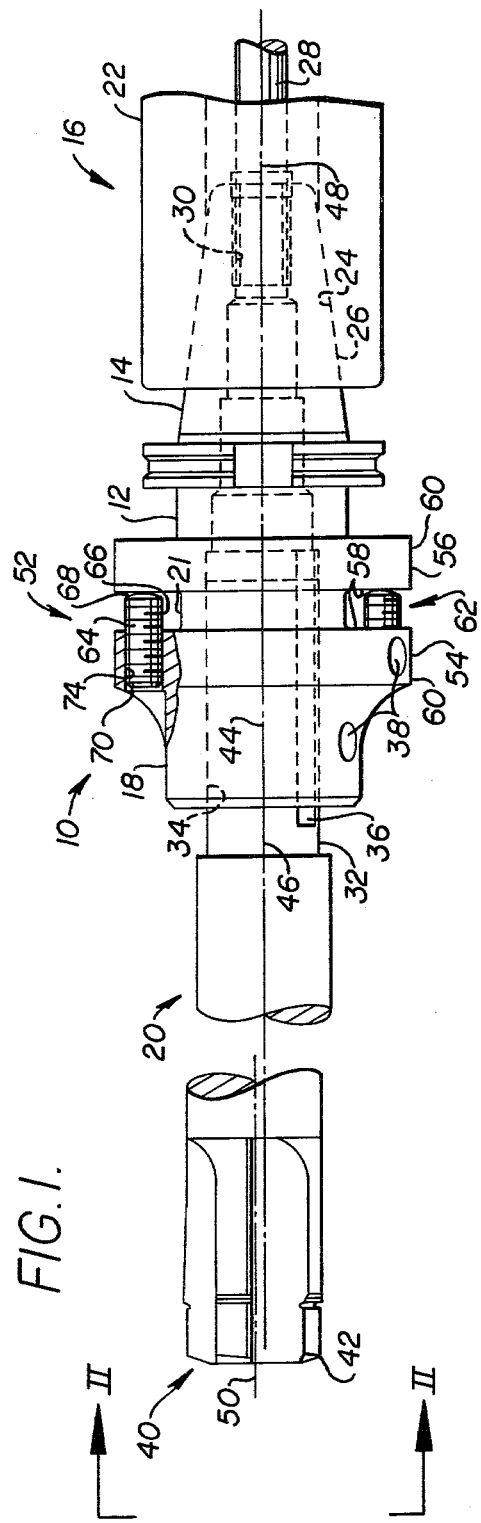
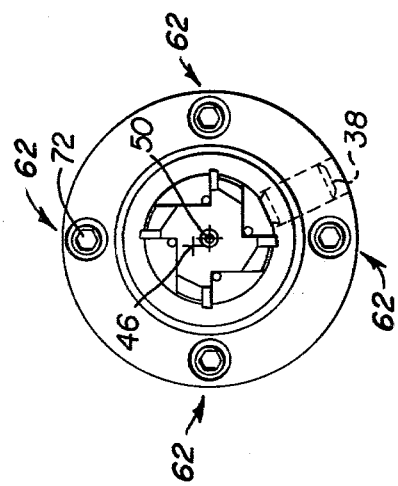

DEFLECTABLE HOLDING ASSEMBLY

DESCRIPTION

Technical Field

This invention relates to a holding assembly for connecting a shaft to a drive member, and more particularly to a deflectable tool holding assembly for positioning the tool in a preselected position.

Background Art

Holding assemblies are known which connect a cutting tool, shaft, or the like to a rotary drive member. Such assemblies include, on one end portion a fastener, for example, threads, splines, collets, etc., which securely connects the holding assemblies to a spindle or shaft of the prime mover. On the other end of such an assembly is provided a fastening device which is connectable to an adjacent end portion of the shaft or cutting tool and securely holds the cutting tool or shaft in place.

Typically, in such holding assemblies, the axis of rotation of the holding assembly and the axis of rotation of the cutting tool or shaft are substantially in alignment at their connection or proximal ends. However, due to manufacturing tolerances, or damage to the cutting tool or shaft in transportation or operation, frequently the cutting tool or shaft itself may not be perfectly straight throughout its length. Therefore, the axis of rotation of the distal end of the cutting tool shaft is not concentric or in alignment with the axis of rotation at the proximal end. This is often referred to by those skilled in the art as runout. As a result, the cutting tool or shaft will wobble or stated another way, the axis of revolution at the distal end will generate or describe a circle rather than a point.

In the case where the holding assembly is used in a machining operation and the cutting tool is a reamer the wobble at the distal end of the reamer would cause, for example, an oversized bore in the workpiece being machined and possibly damage to the reamer itself.

In the situation where the holding assembly connects the drive member to a shaft, for example, of a hydraulic pump, the wobble would cause vibration and radial loading resulting in failure of the pump and drive member.

The present invention is directed to overcoming one or more of the problems as set forth above.

DISCLOSURE OF INVENTION

In one aspect of the present invention, a holding assembly is provided for connecting a shaft to a drive means. The holding assembly includes a body having a first and second end portion and a middle portion, and means for selectively controllably deflecting one of said first and second end portions to preselected relative positions.

BRIEF DESCRIPTION OF DRAWINGS

FIG. 1 is a diagrammatic view of the holding assembly of the present invention with a portion in fragmentary section.

FIG. 2 is a diagrammatic end view of the holding assembly as viewed along line II—II of FIG. 1.

BEST MODE FOR CARRYING OUT THE INVENTION

Referring to the drawings, a holding assembly 10, includes a body 12 having a first end portion 14 connectable to a drive means 16 and a second end portion 18 connectable to a shaft 20 and a substantially cylindrical middle portion 21. The drive means 16 may be of any suitable form well known in the prior art.

The drive means 16 includes a shaft 22 preferably having a tapered bore 24 for receiving therein a taper 26 on the first end portion 14 of said holding assembly 10. The taper 26 on the first end portion 14 is urged into contact with the tapered bore of the shaft 22 by a threaded member 28 screw threadably engaged in a threaded aperature 30. Although the preferred embodiment of the connection at the drive means has been described in some detail, it is to be understood that there are other connecting arrangements, such as threads, splines, collets, etc., which are suitable.

The shaft 20, preferably shown as a cutting tool such as a reamer, has a proximal or first end portion 32, closely slidably impaling a bore 34 axially disposed in the second end portion 18 of the holding assembly 10. A flat 36 is provided on the first end portion 32 of the shaft 20 against which set screws 38 bear. The set screws 38 secure the shaft 20 to the second end portion 18 of the holding assembly 10.

A distal or second end 40 of shaft 20 has a plurality of cutting members 42 thereon suitable for removing material from a workpiece, not shown.

It is to be noted that although the shaft has been described as a cutting tool other shaft embodiments such as drive shafts, pump drive shafts, wheel drive shafts, etc., are applicable for use with this invention.

The holding assembly 10 has a central axis of rotation 44 substantially in alignment with a central axis 46 of the first end portion 32 of shaft 20, and a central axis of rotation 48 of the shaft 22 of drive means 16. The second end or distal end 40 has a central axis 50 which is not coincident or in alignment with the central axis 44, 46 or 48. Therefore, rotation of the drive means 16 and holding assembly 10 about the central axis 48 would result in the end 40 of shaft 20 to revolve or wobble. Stated another way, the central axis 50 of end 40 will describe a circle of revolution rather than a point of rotation. This is often referred to in the machining industry as runout.

To eliminate the aforementioned problem the holding assembly 10, includes a means 52 for selectively controllably deflecting one of the first and second end portions 14, 18 to preselected relative positions wherein the runout at end 40 is eliminated. The deflecting means 52 preferably comprises a first and second spaced apart flanges 54,56 each extending outwardly from the middle portion 21 of the body 12. The flanges 54,56 are preferably annular members but could be individual tabs, projections and the like. The flanges 54,56 are connected to the middle portion 21 of the body 12 and include a bearing surface 58 and an outside surface 60. The bearing surface 58 preferably extends substantially normal to the axis 44. The outside surface 60 is preferably cylindrical in shape and has a diameter of greater dimension than the middle portion 21 between the spaced apart flanges 54,56.

The deflecting means 52 further includes a means 62 for controllably urging the flanges 54,56 and controllably deflecting one of the first and second end portions 14,16 to preselected relative positions. The urging means 62 preferably comprises an elongated cylindrical member 64 having a threaded outer surface 66, a curvilinear end portion 68 and a socket end portion 70. The curvilinear end portion 68 is a bearing surface engageable with one of said bearing surfaces 58. The curvilinear end portion 68 is so shaped to insure point contact with the bearing surface 58 even when the bearing surface is urged from its neutral no load position. The socket end portion 70 is preferably provided with a hexagonal recess 72 for receiving a wrench or the like.

The cylindrical member 64 is screw threadably disposed in a threaded aperature 74 in flange 54. The aperature 74 and dependently the member 64 is positioned substantially normal to the bearing surface 58 and preferably between the flanges 54,56. Therefore, the cylindrical member 64 is rotatably moveable along its threaded outer surface 66 between a position wherein the curvilinear end portion 68 is spaced from the bearing surface 58 and a position wherein the curvilinear end portion 68 is in selective controllable, forceable contact with said bearing surface of said flange.

It is to be noted that the cylindrical member 64 may be screw threadably engaged in aperatures in either flange 54,56 and engageable with the bearing surface 58 on the other.

Preferably, there are at least three equally arcuately spaced apart threaded apertures about the flange 54 and a cylindrical member 64 screw threadably engaged in each of said aperatures. It can therefore be seen that the curvilinear end portion 68 of the cylindrical members 64 are each individually selectively moveable into contact with the flanges 54,56 at discrete spaced apart locations, with a desired magnitude of force to stress the flanges 54,56 and deflect one of the first and second end portions 14,18 of the body 12. Note that the end portion 14,18 that will move is determined by the physical restraints placed upon the end portions. The end portion 14,18 easiest to move will move first. Three spaced apart points are required to define a plane and there are at least three spherical end portions 68 provided herein.

Heretofore we have provided threaded cylindrical members 64 to forceably engage the flanges 54,56 and deflect the end portions 14,18. It is to be understood that other embodiments, such as cams, clamps and the like, are capable of providing forceable engagement with the flanges 54,56, and such embodiments do not depart from the spirit of the invention.

Industrial Applicability

In operation, the holding assembly 10 is secured to the shaft 22 of the drive means 16 by drawing the taper 26 on first end portion 14 into forceable contact with the tapered bore 24 of shaft 22 via threaded member 28.

The shaft 20 and specifically the first end portion 32 is inserted into the bore 34 on the second end portion 18 of holding assembly 10. The shaft 20 is rotated in the bore 34 until the flat 36 faces the set screws 38. The set screws 38 are then urged into contact with the flat 36.

The operator then rotates the entire holding assembly 10 and checks the runout of the shaft 20 at the second end 40. If the central axis 50 of the second end 40 is not in alignment with the central axis of rotation 44,46,48 of holding assembly 10, shaft 20, or shaft 22, runout will be observed.

The operator will then stop rotation of the assembly 10, noting the location of the runout and adjust each of the urging means 62 until the central axis 50 of the second end 40 of shaft 20 is in alignment with at least the central axis of rotation 48 of shaft 22.

As previously discussed, adjustment to remove runout at the second end 40 of shaft 20 is achieved by deflecting the second end portion 18 to a position determined by the location of the runout at the second end 40. Deflection of the second end portion 18 is specifically achieved by selectively rotating each of the plurality of cylindrical 64 members separately but sequentially into forceable contact with the flanges 56, which tends to force the flanges 54,56 apart at the location of contact. By adjusting each cylindrical member 64 in this manner the exact angle of deflection and magnitude may be achieved.

When the holding assembly 10 is adjusted to eliminate runout at the second end 40 of shaft 20, runout may be introduced at some other location such as in the middle portion 21 of the holding assembly 10, or first end portion 32 of shaft 20, etc. This will not be detrimental to the operation of the apparatus since the central axis 48 of the shaft 22 of the drive means 16 and the central axis 50 of the second end 40 of shaft 20 are in alignment. Thus, the input and output are in alignment at the critical locations.

Upon completion of the adjustment, the operator will rotate the holding assembly and check for runout once again. If further adjustment is needed, the same procedure as discussed above will be followed.

Other aspects, objects and advantages of this invention can be obtained from a study of the drawings, the specification, and the appended claims.

We claim:

1. In a holding assembly (10) for connecting a shaft (20) to a drive means (16), said assembly having a body (12), said body having a first end portion (14) connectable to the drive means (16), a second end portion (18) connectable to the shaft (20) and a middle portion (21), the improvement comprising:

first and second spaced apart flanges (54,56) extending outwardly from the middle portion (21) of the body (12), said body being a unitary piece; and means (62) for controllably urging the flanges (54,56) and controllably deflecting the middle portion (21) of body (12) and moving the second end portion (18) of said body (12) to preselected relative positions in response to deflection of said middle portion (21).

2. The holding assembly (10), as set forth in claim 1, wherein there are at least three spaced apart urging means (62) associated with said flanges (54,56), said urging means (62) being spaced about the assembly (10) substantially equal arcuate distances from one another.

3. The holding assembly (10), as set forth in claim 1, wherein said urging means (62) are positioned between said first and second flanges (54,56).

4. The holding assembly (10), as set forth in claim 2, wherein at least one of said first and second flanges (54,56) has a bearing surface (58) and said urging means (62) are each connected to one of said first and second flanges (54,56) and individually controllably positionable into forceable contact with said bearing surface (58) of the other of said flanges (54,56).

5. The holding assembly (10), as set forth in claim 4, wherein each of said urging means (62) is an elongated cylindrical member (64) screw threadably connected to one of said first and second flanges (54,56) and moveable along its threaded length (66) in directions substantially normal to said bearing surface (58).

6. The holding assembly (10), as set forth in claim 5, wherein said cylindrical member (64) has an end of curvilinear configuration (68).

7. The holding assembly (10), as set forth in claim 1, wherein said first and second flanges (54,56) are annular members having an outer surface (60) substantially larger in diameter than the diameter of the middle portion (21).

8. The holding assembly (10), as set forth in claim 1 wherein said first and second flanges (54,56) are annular members each having an outer cylindrical surface (60) and a bearing surface (58), each of said bearing surfaces (58) extending radially outwardly from said middle portion (21) to a location adjacent said outer cylindrical surface (60), said bearing surfaces (58) being spaced from one another and in bearing surface facing relationship, said middle portion (21) between said spaced apart bearing surfaces (58) having a cylindrical outer surface and being of a diameter smaller than the diameter of said outer surface (60) of said annular members (54,56).

* * * * *